United States Patent
Hai (10) Patent No.: US 12,072,580 B2
(45) Date of Patent: Aug. 27, 2024

(54) LIGHT SOURCE MODULE, LIQUID CRYSTAL DISPLAY DEVICE, AND DISPLAY APPARATUS

(71) Applicant: TCL CHINA STAR OPTOELECTRONICS TECHNOLOGY CO., LTD., Guangdong (CN)

(72) Inventor: Bo Hai, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/597,947

(22) PCT Filed: Jan. 20, 2022

(86) PCT No.: PCT/CN2022/072910
§ 371 (c)(1),
(2) Date: Jul. 13, 2023

(87) PCT Pub. No.: WO2023/130510
PCT Pub. Date: Jul. 13, 2023

(65) Prior Publication Data
US 2024/0036399 A1 Feb. 1, 2024

(30) Foreign Application Priority Data
Jan. 10, 2022 (CN) .......... 202210020909.8

(51) Int. Cl.
*G02F 1/1335* (2006.01)
*F21V 8/00* (2006.01)

(52) U.S. Cl.
CPC ..... *G02F 1/133616* (2021.01); *G02B 6/0036* (2013.01)

(58) Field of Classification Search
CPC .......... G02F 1/133616; G02B 6/0036
See application file for complete search history.

(56) References Cited

U.S. PATENT DOCUMENTS

| 2003/0174261 A1 | 9/2003 | Sugiura et al. |
| 2004/0179154 A1 | 9/2004 | Hong |

(Continued)

FOREIGN PATENT DOCUMENTS

| CN | 1396482 A | 2/2003 |
| CN | 1504809 A | 6/2004 |

(Continued)

OTHER PUBLICATIONS

International Search Report in International application No. PCT/CN2022/072910, mailed on Oct. 10, 2022.

(Continued)

*Primary Examiner* — Anne M Hines
*Assistant Examiner* — Jose M Diaz
(74) *Attorney, Agent, or Firm* — PV IP PC; Wei Te Chung; Zhigang Ma (57) ABSTRACT

A light source module, liquid crystal display device and display apparatus. The light source module comprises a light guide plate and a light source disposed on the light guide plate side, and a plurality of micro structures are disposed on a light guide surface of the light guide plate. The light source module can provide a reflective liquid crystal display panel with an area light source similar to ambient light to improve light exiting brightness of the reflective liquid crystal display panel such that reflective liquid crystal display panel also has a better display effect in a dark environment and under a condition without ambient light.

16 Claims, 6 Drawing Sheets

(56) References Cited

U.S. PATENT DOCUMENTS

2012/0281430 A1* 11/2012 Huang ................ G02B 6/0061
  362/603
2021/0141147 A1* 5/2021 Yasunaga ............. G02B 6/0068

FOREIGN PATENT DOCUMENTS

| CN | 1573473 | A | 2/2005 |
| CN | 1971359 | A | 5/2007 |
| CN | 101169541 | A | 4/2008 |
| CN | 102155687 | A | 8/2011 |
| CN | 102279498 | A | 12/2011 |
| CN | 102767748 | A | 11/2012 |
| CN | 103197370 | A | 7/2013 |
| CN | 103712124 | A | 4/2014 |
| CN | 107783221 | A | 3/2018 |
| CN | 108363137 | A | 8/2018 |
| CN | 110515151 | A | 11/2019 |
| CN | 110764324 | A | 2/2020 |
| CN | 111708220 | A | 9/2020 |
| CN | 111999792 | A | 11/2020 |
| CN | 112255829 | A | 1/2021 |
| CN | 112946953 | A | 6/2021 |
| CN | 214335425 | U | 10/2021 |
| JP | 2001133774 | A | 5/2001 |
| JP | 3215833 | U | 4/2018 |

OTHER PUBLICATIONS

Written Opinion of the International Search Authority in International application No. PCT/CN2022/072910, mailed on Oct. 10, 2022.

Chinese Office Action issued in corresponding Chinese Patent Application No. 202210020909.8 dated Oct. 10, 2022, pp. 1-8.

* cited by examiner

LIGHT SOURCE MODULE, LIQUID CRYSTAL DISPLAY DEVICE, AND DISPLAY APPARATUS

FIELD OF INVENTION

The present application relates to a field of display technologies, especially to a light source module, a liquid crystal display device, and a display apparatus.

BACKGROUND OF INVENTION

A liquid crystal display (LCD) device has many advantages such as thin body, power saving, no radiation, etc., is extensively applied in fields of: cell phone, personal digital assistant (PDA), digital camera, computer screen, or notebook screen.

Most of conventional liquid crystal display devices in the market are transmissive liquid crystal display devices in which a backlight source is disposed under a liquid crystal display panel, and adjusting a transmittance of the liquid crystal display panel implements display under different brightness.

SUMMARY OF INVENTION

Technical Issue

According to different applications, the liquid crystal display devices further include a reflective liquid crystal display device. Under irradiation of ambient light, the reflective liquid crystal display device can reflect the ambient light to perform display. Outdoor high ambient light has a better display effect. However, when brightness of ambient light is lowered, especially in a dark environment such as a night, the display effect is lowered accordingly. Especially, the reflective liquid crystal display device cannot work normally without the ambient light.

Technical Solution

An embodiment of the present application provides a light source module, a liquid crystal display device, and a display apparatus. The light source module can provide a reflective liquid crystal display panel with an area light source such that the reflective liquid crystal display panel can achieve a better display effect both in a dark environment and under a condition without ambient light.

In a first aspect, the embodiment of the present application provides a light source module, comprising:
  a light guide plate, the light guide plate comprises a light guide surface and a light exiting surface disposed oppositely, wherein a plurality of micro structures are disposed on a light guide surface of the light guide plate at intervals; and
  a light source disposed on a side of the light guide plate.

In some embodiments, an area of each of the micro structures is the same.

In some embodiments, the micro structures are distributed evenly the light guide surface at the intervals.

In some embodiments, the light source module comprises a reflector disposed on the side of the light guide plate.

In some embodiments, the side of the light guide plate comprises a first side and a third side disposed oppositely and a second side and a fourth side disposed oppositely, in the first side, the second side, the third side and the fourth side, the light source is disposed on an outer side of one of the first to fourth sides, and the reflectors are disposed on outer sides of the other three of the first to fourth sides.

In some embodiments, the reflector and the light guide plate are adhered together through a light transmission adhesive.

In some embodiments, the micro structures are protrusion structures or recess structures.

In some embodiments, the protrusion structures comprises at least one of curved protrusions or conic protrusions; the recess structures comprise at least one of curved recesses or conic recesses.

In a second aspect, the embodiment of the present application provides a liquid crystal display device, comprising:
  a reflective liquid crystal display panel; and
  a light source module stacked on the reflective liquid crystal display panel, wherein the light source module is the light source module as above, and a light exiting surface of the light guide plate is disposed toward a display side of the reflective liquid crystal display panel.

In some embodiments, the reflective liquid crystal display panel comprises a first substrate and a second substrate disposed oppositely and a liquid crystal layer disposed between the first substrate and the second substrate, a side of the first substrate away from the liquid crystal layer is disposed toward the light guide plate, and a reflective layer is disposed in the second substrate.

In a third aspect, the embodiment of the present application provides a display apparatus, comprising the liquid crystal display device as above.

Advantages

The light source module provided by the embodiment of the present application comprises a light guide plate and a light source disposed on the light guide plate side. A plurality of micro structures are disposed on a light guide surface of the light guide plate. When light emitted out from the light source enters the light guide plate and is transmitted into the micro structures, diffuse reflection occurs to result in change of a transmission direction of light such that a part of light is emitted out from a light exiting surface of the light guide plate to achieve light extraction. The light source module can provide a reflective liquid crystal display panel with an area light source similar to ambient light to improve light exiting brightness of the reflective liquid crystal display panel such that reflective liquid crystal display panel also has a better display effect in a dark environment and under a condition without ambient light.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF PREFERRED EMBODIMENTS

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application.

Figure 1:
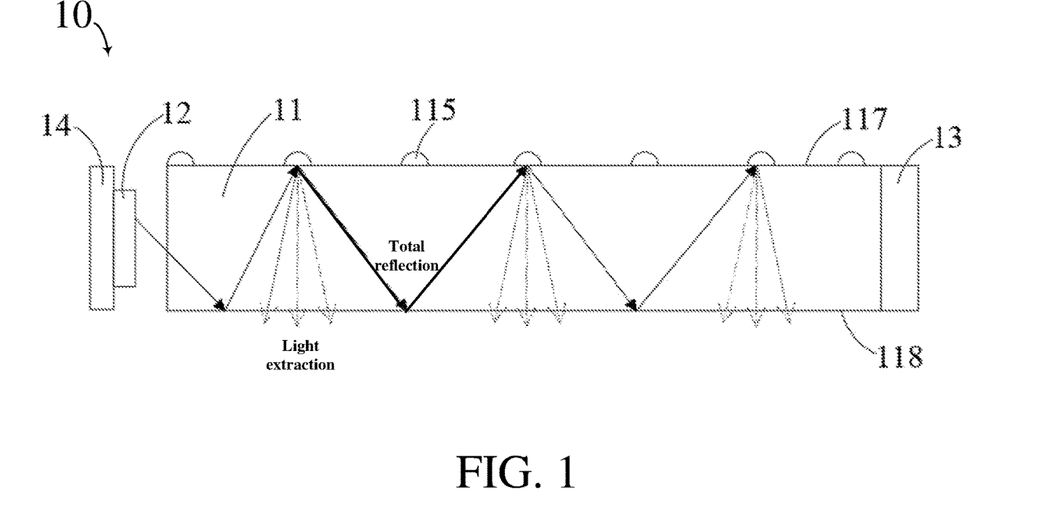
FIG. 1 is a schematic cross-sectional view of a light source module provided by the embodiment of the present application.

With reference to FIG. 1, FIG. 1 is a schematic cross-sectional view of a light source module provided by the embodiment of the present application. The embodiment of the present application provides a light source module 10 comprising a light guide plate 11 and a light source 12 disposed on a side of the light guide plate 11. The light guide plate 11 comprises a light guide surface 117 and a light exiting surface 118 disposed oppositely. A plurality of micro structures 115 are disposed on the light guide surface 117 of the light guide plate 11 at intervals.

It should be explained that the micro structures 115 on the light guide plate 11 can perform a function of damaging light total reflection. Light emitted out from the light source 12, after entering the light guide plate 11 through a light incident side, has total reflection on a region of the light guide surface 117 without the micro structures 115 such that the light is transmitted from the light incident side to a light exiting side. When light in the light guide plate 11 enters the micro structures 115, diffuse reflection occurs to result in change of light transmission direction, and a part of light is transmitted out from the light exiting surface 118 of the light guide plate 11 to achieve light extraction. In FIG. 1, a light transmission path depicted with solid lines is a total reflection path of the light, and a light transmission path depicted with broken lines is a light extraction path.

For example, the micro structures 115 can be disposed on an entire surface of the light guide surface 117 of the light guide plate 11.

Figure 2:
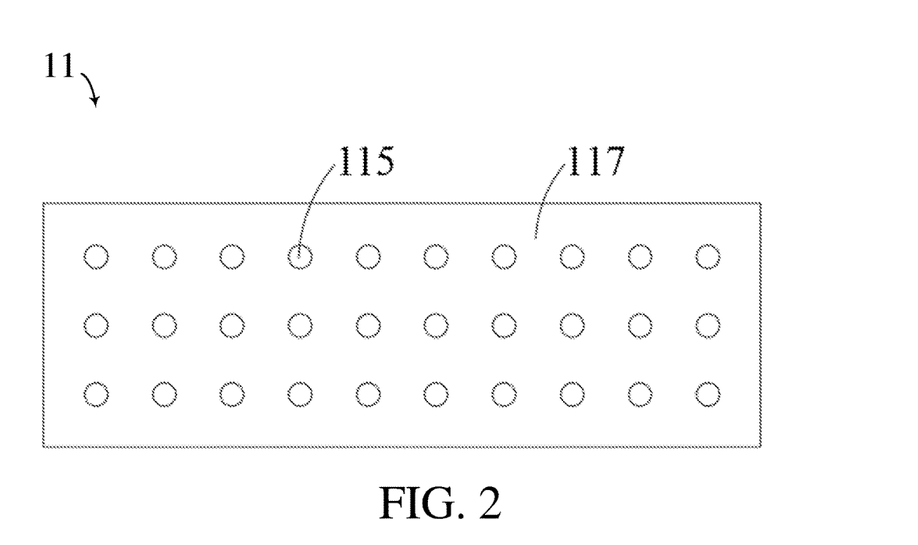
FIG. 2 is a schematic top view of a light guide plate provided by the embodiment of the present application.

With reference to FIG. 2, FIG. 2 is a schematic top view of a light guide plate provided by the embodiment of the present application. For example, areas of the micro structures 115 are the same (i.e., areas of orthographic projections of the micro structures 115 on the light guide plate 11 are the same).

With reference to FIG. 2, in some embodiments, the micro structures 115 are distributed evenly on the light guide surface 117 at intervals. Namely, the intervals among the micro structures 115 are uniform and consistent. For example, the micro structures 115 can be arranged in an array on the light guide plate 11.

In some embodiments, a side of the light guide plate 11 disposed toward the light source 12 is defined as a light incident side, a side of the light guide plate 11 disposed away from the light source 12 is defined as light exiting side. From the light incident side to light exiting side, the intervals among the micro structures 115 are kept even and consistent, and the areas of the micro structures 115 gradually increase or decrease.

In some other embodiments, from the light incident side to the light exiting side, the areas of micro structures 115 are kept uniform and consistent, and the intervals among the micro structures 115 gradually increase or decrease.

Figure 3:
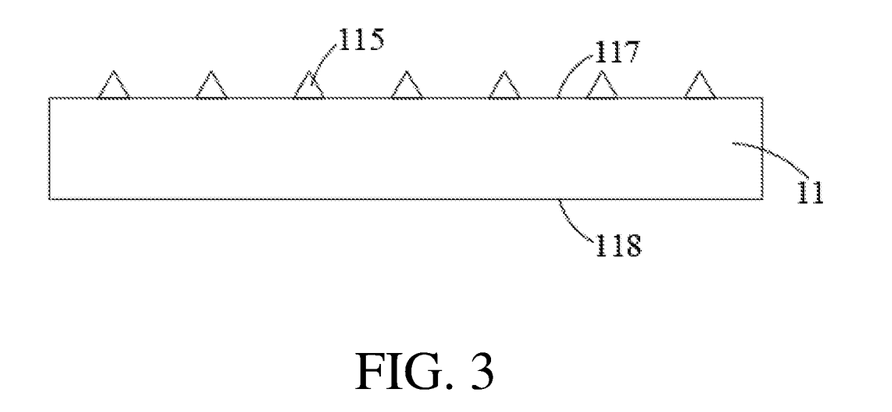
FIG. 3 is a first schematic cross-sectional view of the light guide plate provided by the embodiment of the present application.
Figure 4:
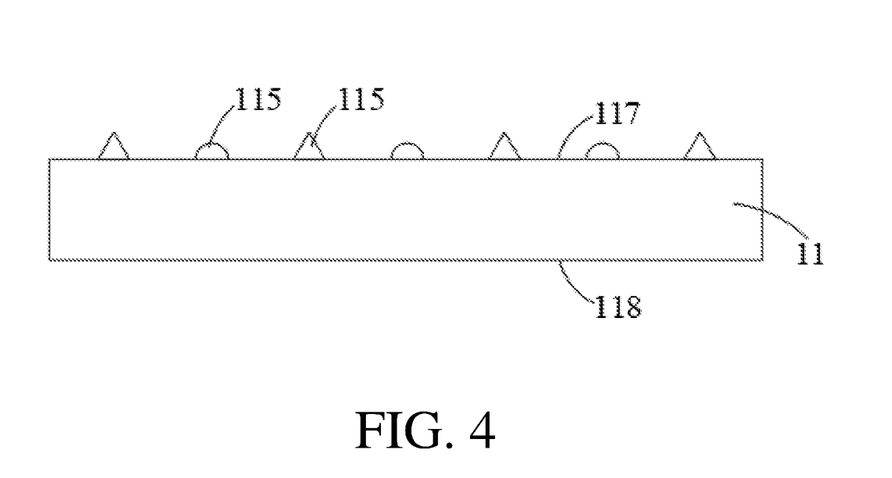
FIG. 4 is a second schematic cross-sectional view of the light guide plate provided by the embodiment of the present application.

With reference to FIGS. 1, 3, and 4, FIG. 3 is a first schematic cross-sectional view of the light guide plate provided by the embodiment of the present application, FIG. 4 is a second schematic cross-sectional view of the light guide plate provided by the embodiment of the present application. The micro structures 115 can be protrusion structures. For example, protrusion structures can comprise at least one of curved protrusions or conic protrusions. For example, the curved protrusion can be hemispherical, and the conic protrusion can be triangular pyramid-shaped, quadrangular pyramid-shaped, pentagonal pyramid-shaped, or hexagonal pyramid-shaped. In some embodiments, the protrusion structures can be formed by an inkjet printing process printing light transmission an ink material.

Figure 5:
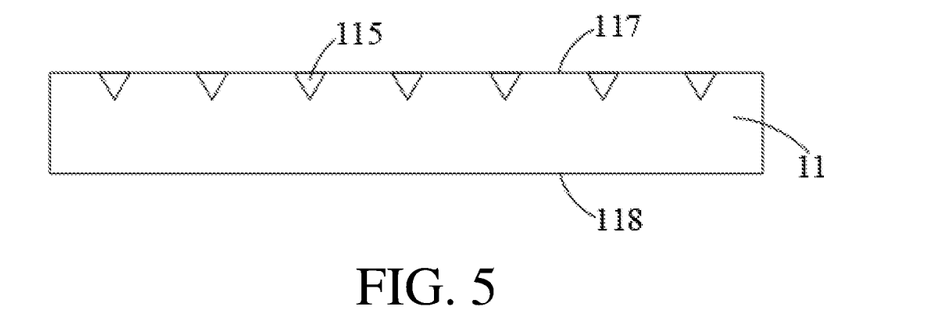
FIG. 5 is a third schematic cross-sectional view of the light guide plate provided by the embodiment of the present application.
Figure 6:
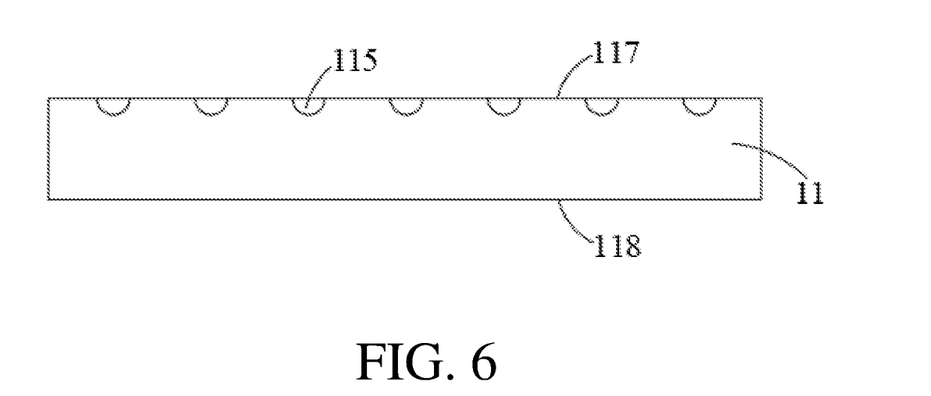
FIG. 6 is a fourth schematic cross-sectional view of the light guide plate provided by the embodiment of the present application.
Figure 7:
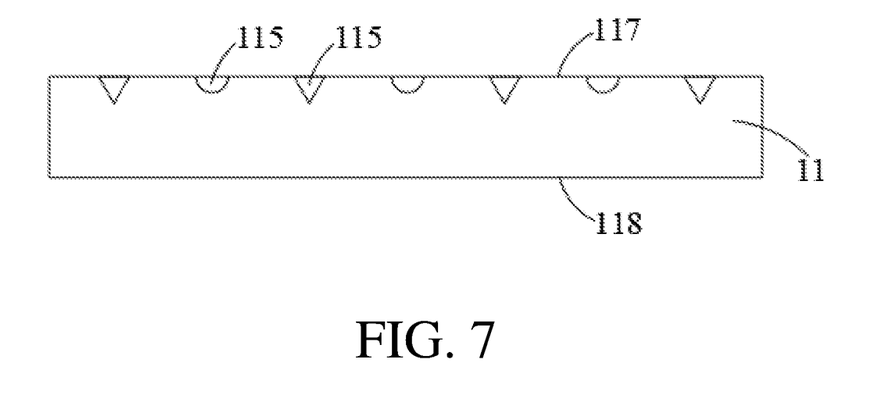
FIG. 7 is a fifth schematic cross-sectional view of the light guide plate provided by the embodiment of the present application.

With reference to FIGS. 5, 6, and 7, FIG. 5 is a third schematic cross-sectional view of the light guide plate provided by the embodiment of the present application, FIG. 6 is a fourth schematic cross-sectional view of the light guide plate provided by the embodiment of the present application, and FIG. 7 is a fifth schematic cross-sectional view of the light guide plate provided by the embodiment of the present application. the micro structures 115 can be recess structures, and the recess structures can comprise at least one of curved recesses or conic recesses. For example, curved recess can be hemispherical, and the conic recesses can be triangular pyramid-shaped, quadrangular pyramid-shaped, pentagonal pyramid-shaped, or hexagonal pyramid-shaped. In some embodiments. The recess structures can be formed by a laser process.

With reference to FIGS. 1 and 3, the micro structures 115 on the light guide plate 11 can be all curved protrusions or all conic protrusions.

With reference to FIGS. 5 and 6, the micro structures 115 of the light guide plate 11 can be all curved recesses or all conic recesses.

With reference to FIG. 4, the micro structures 115 on the light guide plate 11 can comprise curved protrusions and conic protrusions, and curved protrusions and the conic protrusions are disposed alternately.

With reference to FIG. 7, the micro structures 115 on the light guide plate 11 can comprise curved recesses and conic recesses, and the curved recess and conic recess are disposed alternately.

With reference to FIG. 1, the light source module 10 can include a reflector 13 disposed on a side of the light guide plate 11. It can be understood that the reflector 13 can reflect light emitted out from the side of the light guide plate 11 back to the light guide plate 11 by a mirror surface reflection for repeated use to prevent light loss and improve light use rate such that light exiting brightness of the light guide plate 11 is increased to further improve light exiting brightness of the liquid crystal display device 100.

Figure 8:
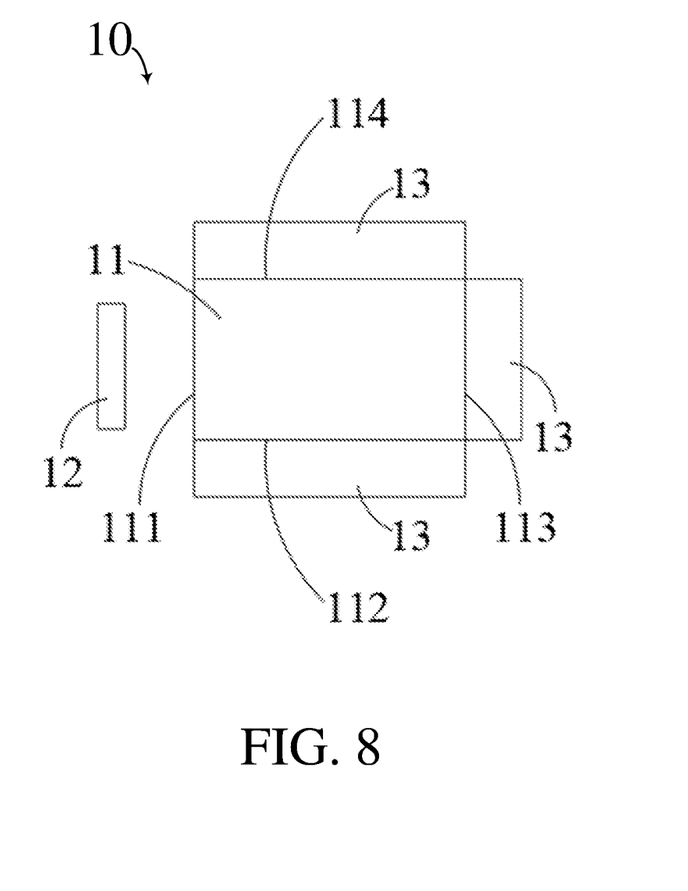
FIG. 8 is a first schematic top view of the light source module provided by the embodiment of the present application.
Figure 9:
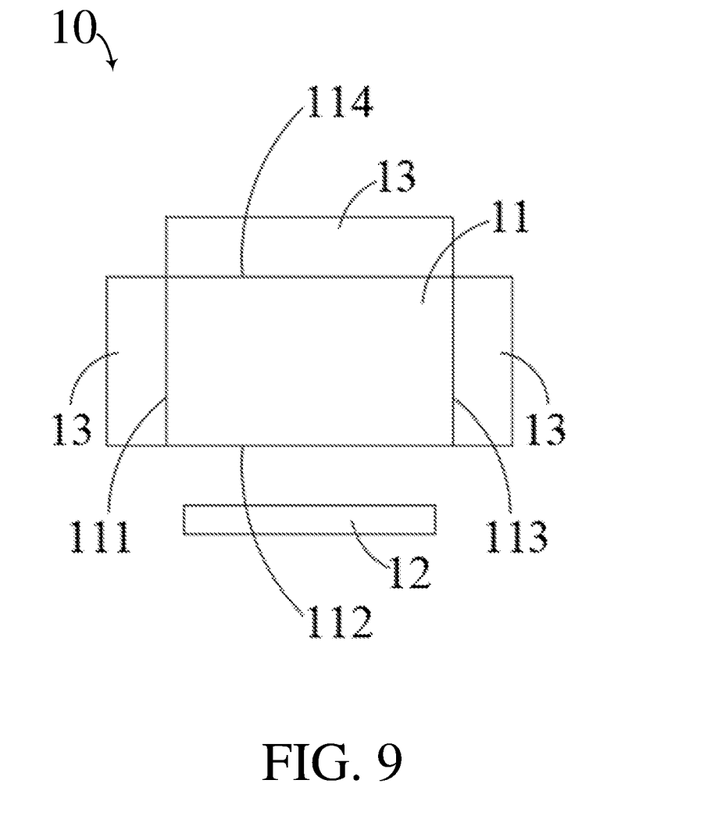
FIG. 9 is a second schematic top view of the light source module provided by the embodiment of the present application.

With reference to FIGS. 8 and 9, FIG. 8 is a first schematic top view of the light source module provided by the embodiment of the present application, FIG. 9 is a second schematic top view of the light source module provided by the embodiment of the present application. The side of the light guide plate 11 comprises a first side 111 and a third side 113 disposed oppositely and a second side 112 and a fourth side 114 disposed oppositely. In the first side 111, second side 112, third side 113, and fourth side 114, the light source is disposed on an outer side of one of the first to fourth sides 12, and the reflectors 13 are disposed on outer sides of the other three of the first to fourth sides. Namely, the reflector 13 are disposed on regions of the sides of the light guide plate 11 except for a region corresponding to a position of the light source 12 to maximally improve a light use rate.

With reference to FIGS. 8 and 9, For example, a length of the first side 111 is equal to a length of the third side 113, a length of the second side 112 is equal to a length of the fourth side 114, and the length of the first side 111 is less than the length of the second side 112.

With reference to FIG. 8, in some embodiments, the light source 12 is disposed on the outer side of the first side 111, and the reflectors 13 are disposed on the outer sides of the second side 112, the third side 113, and the fourth side 114.

With reference to FIG. 9, in some embodiments, the light source 12 is disposed on the outer side of the second side 112, and the reflectors 13 are disposed on the outer sides of the first side 111, the third side 113, and the fourth side 114.

With reference to FIGS. 8 and 9, the first side 111, the second side 112, the third side 113, and the fourth side 114 are sequentially connected in series, the first side 111 is parallel to the third side 113, the second side 112 is parallel to the fourth side 114, the first side 111 is perpendicular to the second side 112. At this time, the light guide plate 11 is rectangular. It can be understood that in some other embodiments, the light guide plate 11 can also be square or rhombic.

For example, the reflector 13 and the light guide plate 11 can be adhered together through a light transmission adhesive.

For example, a material of the reflector 13 is metal. In some embodiments, the material of the reflector 13 can include at least one of aluminum (Al), silver (Ag), tungsten (W), copper (Cu), nickel (Ni), chromium (Cr), molybdenum (Mo), titanium (Ti), platinum (Pt), tantalum (Ta), and neodymium (Nd).

For example, a material of the light guide plate 11 can be plastic, for example, polycarbonate (PC).

For example, the light source 12 can be a light-emitting diode (LED) lamp. In some embodiments, the light source 12 can be composed of a plurality of LEDs.

With reference to FIG. 1, light source module 10 can also comprise a frame 14, and the frame 14 can perform a function of fixing the light source 12.

Figure 10:
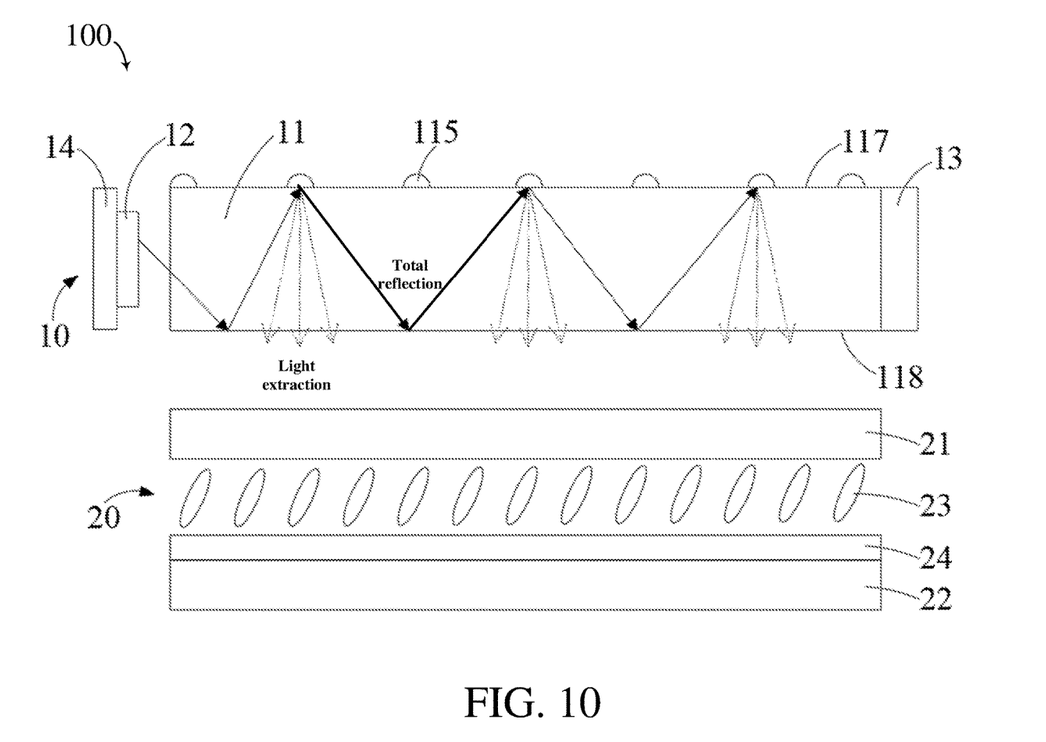
FIG. 10 is a schematic cross-sectional view of a liquid crystal display device provided by the embodiment of the present application.

With reference to FIG. 10, FIG. 10 is a schematic cross-sectional view of a liquid crystal display device provided by the embodiment of the present application. the embodiment of the present application provides a liquid crystal display device 100 comprising a reflective liquid crystal display panel 20 and a light source module 10 stacked on each other. The light source module 10 can be the light source module 10 of any one of the above embodiments. The light exiting surface 118 of the light guide plate 11 is disposed toward a display side of the reflective liquid crystal display panel 20.

It can be understood that light extracted from the light guide plate 11 would enter the reflective liquid crystal display panel 20 and provide the reflective liquid crystal display panel 20 with an area light source to improve display brightness and display effect of the reflective liquid crystal display panel Namely, liquid crystal display device 100 provided by the embodiment of the present application, by disposing the light source module 10 displosed on the reflective liquid crystal display panel 20 layer, can provide the reflective liquid crystal display panel 20 with an area light source similar to ambient light to improve light exiting brightness of the reflective liquid crystal display panel such that the liquid crystal display device 100 also has a better display effect in a dark environment and a condition without ambient light.

With reference to FIG. 1, the reflective liquid crystal display panel 20 includes a first substrate 21 and a second substrate 22 disposed oppositely and a liquid crystal layer 23 disposed between the first substrate 21 and the second substrate 22. A side of the first substrate 21 away from the liquid crystal layer 23 is disposed toward the light guide plate 11. A reflective layer 24 is disposed in the second substrate 22. For example, the first substrate 21 can be a color filter (CF) substrate, and the second substrate 22 can be a thin film transistor (TFT) array substrate.

It can be understood that light emitted out from the light guide plate 11, entering the reflective liquid crystal display panel 20 from a side of the first substrate 21 away from the liquid crystal layer 23, would pass through the liquid crystal layer 23 and enter the reflective layer 24. At this time, the reflective layer 24 would reflect incident light. Because the reflected light needs to pass through the liquid crystal layer 23 before emitting out from the reflective liquid crystal display panel 20. Therefore, light transmission rates of different regions of the liquid crystal layer 23 can be adjusted by controlling rotation angles of liquid crystal materials in different regions of the liquid crystal layer 23, to further control light exiting brightness of different regions of the reflective liquid crystal display panel 20.

For example, a material of the reflective layer 24 can be metal. In some embodiments, a material of the reflective layer 24 can include at least one of aluminum (Al), silver (Ag), tungsten (W), copper (Cu), nickel (Ni), chromium (Cr), molybdenum (Mo), titanium (Ti), platinum (Pt), tantalum (Ta), and neodymium (Nd).

In some embodiments, the reflective layer 24 and TFT devices in the second substrate 22 can be formed in the same process. Namely, the material of the reflective layer 24 can be the same as a material of some metal layer (for example, source electrode, drain electrode, and gate electrode) of the TFT device.

The embodiment of the present application further provides a display apparatus, including the liquid crystal display device 100 of any one of the above embodiments.

For example, display apparatus can be an electronic product such as television, advertisement screen, cell phone, tablet, computer display, game apparatus, augmented reality (AR) apparatus, (Virtual Reality, VR) apparatus, or wearable apparatus. The wearable apparatus can be smart bracelet, smart glasses, smart watch, or smart decoration.

The light source module, liquid crystal display device, and display apparatus provided by the embodiment of the present application are described in detail as above. In the specification, the specific examples are used to explain the principle and embodiment of the present application. The above description of the embodiments is only used to help understand the method of the present application and its spiritual idea. Meanwhile, for those skilled in the art, according to the present idea of invention, changes will be made in specific embodiment and application. In summary, the contents of this specification should not be construed as limiting the present application.

What is claimed is:

1. A light source module, wherein comprising:
a light guide plate, the light guide plate comprises a light guide surface and a light exiting surface disposed oppositely, wherein a plurality of micro structures are disposed on a light guide surface of the light guide plate at intervals; and
a light source disposed on a side of the light guide plate;
wherein the light source module comprises a reflector disposed on the side of the light guide plate;
wherein the side of the light guide plate comprises a first side and a third side disposed oppositely and a second side and a fourth side disposed oppositely, in the first side, the second side, the third side and the fourth side, the light source is disposed on an outer side of one of the first to fourth sides, and the reflectors are disposed on outer sides of the other three of the first to fourth sides.

2. The light source module according to claim 1, wherein an area of each of the micro structures is the same.

3. The light source module according to claim 1, wherein the micro structures are distributed evenly the light guide surface at the intervals.

4. The light source module according to claim 1, wherein the reflector and the light guide plate are adhered together through a light transmission adhesive.

5. The light source module according to claim 1, wherein the micro structures are protrusion structures or recess structures.

6. The light source module according to claim 5, wherein the protrusion structures comprises at least one of curved protrusions or conic protrusions.

7. The light source module according to claim 5, wherein the recess structures comprise at least one of curved recesses or conic recesses.

8. A liquid crystal display device, comprising:
a reflective liquid crystal display panel; and
a light source module stacked on the reflective liquid crystal display panel, wherein the light source module is the light source module according to claim 1, and a light exiting surface of the light guide plate is disposed toward a display side of the reflective liquid crystal display panel;
wherein the light source module comprises a reflector disposed on the side of the light guide plate;
wherein the side of the light guide plate comprises a first side and a third side disposed oppositely and a second side and a fourth side disposed oppositely, in the first side, the second side, the third side and the fourth side, the light source is disposed on an outer side of one of the first to fourth sides, and the reflectors are disposed on outer sides of the other three of the first to fourth sides.

9. The liquid crystal display device according to claim 8, wherein an area of each of the micro structures is the same.

10. The liquid crystal display device according to claim 8, wherein the micro structures are distributed evenly the light guide surface at the intervals.

11. The liquid crystal display device according to claim 8, wherein the reflector and the light guide plate are adhered together through a light transmission adhesive.

12. The liquid crystal display device according to claim 8, wherein the micro structures are protrusion structures or recess structures.

13. The liquid crystal display device according to claim 12, wherein the protrusion structures comprise at least one of curved protrusions or conic protrusions.

14. The liquid crystal display device according to claim 12, wherein the recess structures comprise at least one of curved recesses or conic recesses.

15. The liquid crystal display device according to claim 8, wherein the reflective liquid crystal display panel comprises a first substrate and a second substrate disposed oppositely and a liquid crystal layer disposed between the first substrate and the second substrate, a side of the first substrate away from the liquid crystal layer is disposed toward the light guide plate, and a reflective layer is disposed in the second substrate.

16. A display apparatus, comprising the liquid crystal display device according to claim 8.

* * * * *